US007886224B2

(12) United States Patent
Sakai et al.

(10) Patent No.: US 7,886,224 B2
(45) Date of Patent: Feb. 8, 2011

(54) SYSTEM AND METHOD FOR TRANSFORMING TABULAR FORM DATE INTO STRUCTURED DOCUMENT

(75) Inventors: Miyuki Sakai, Tokyo (JP); Atsuko Eguchi, Kokubunji (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 805 days.

(21) Appl. No.: 11/861,096

(22) Filed: Sep. 25, 2007

(65) Prior Publication Data

US 2008/0082571 A1 Apr. 3, 2008

(30) Foreign Application Priority Data

Sep. 29, 2006 (JP) ............................ 2006-269054

(51) Int. Cl.
*G06F 17/00* (2006.01)

(52) U.S. Cl. ...................... 715/234; 715/255; 715/221; 715/236; 715/227

(58) Field of Classification Search ................. 715/234, 715/200, 255, 221, 212, 227, 236; 707/830
See application file for complete search history.

(56) References Cited

U.S. PATENT DOCUMENTS 7,149,967 B2 * 12/2006 Pollock et al. .............. 715/243
7,584,414 B2 * 9/2009 Mortensen .................. 715/212
7,743,040 B2 * 6/2010 Rys et al. .................... 707/705

(Continued)

FOREIGN PATENT DOCUMENTS

JP 07-295776 11/1995

(Continued)

OTHER PUBLICATIONS

Notice of Reasons for Rejection mailed May 7, 2008 from the Japanese Patent Office for a counterpart Japanese Patent Application No. 2006-269054.

(Continued)

*Primary Examiner*—Thu Huynh
(74) *Attorney, Agent, or Firm*—Finnegan, Henderson, Farabow, Garrett & Dunner, L.L.P.

(57) ABSTRACT

A definition data storage unit stores definition data defining a rule for transforming tabular form data into a structured document. The definition data includes a conditional repeat specifying description specifying grouping of part of tabular form data rows which corresponds to a common item having a single value. The conditional repeat specifying description includes the common item as an attribute value for a condition for repetition. The definition data further includes a portion into which the tabular form data is inserted as content of an element. The portion includes a value insertion specifying description made to correspond to an item name of an item included in the tabular form data. A transformation unit transforms tabular form data based on the definition data, with the part of the rows grouped as one group, and embeds the value of the item name in a portion specified by the value insertion specifying description.

10 Claims, 10 Drawing Sheets

U.S. PATENT DOCUMENTS

| | | | | |
|---|---|---|---|---|
| 2003/0023639 | A1* | 1/2003 | Chen et al. | 707/530 |
| 2004/0261017 | A1* | 12/2004 | Perry | 715/513 |
| 2007/0130110 | A1* | 6/2007 | Graefe et al. | 707/2 |
| 2007/0192285 | A1* | 8/2007 | Wang et al. | 707/2 |
| 2008/0133527 | A1* | 6/2008 | Cipriano et al. | 707/7 |

FOREIGN PATENT DOCUMENTS

| | | |
|---|---|---|
| JP | 2005-56085 | 3/2005 |
| JP | 2006-012145 | 1/2006 |

OTHER PUBLICATIONS

Notice of Reasons for Rejection mailed May 7, 2008 from the Japanese Patent Office for a counterpart Japanese Patent Application No. 2006-269054.

"Programmer's Reference XSLT Bible" written by Michael Kay, Translated by IDEA.C, 1st edition, published by Kabushiki Kaisha IMPRESS, Jan. 11, 2002, pp. 297-300.

* cited by examiner

```
staff member number, name, section
1, Tanaka, sales
2, Sato, technique
3, Suzuki, sales
```

FIG. 3

```
<sections>
  <section>
    <sectionName>sales</sectionName>
    <staffMember>
      <staffMemberNumber>1</staffMemberNumber>
      <name>Tanaka</name>
    </staffMember>
    <staffMember>
      <staffMemberNumber>3</staffMemberNumber>
      <name>Suzuki</name>
    </staffMember>
  </section>
  <section>
    <sectionName>technique</sectionName>
    <staffMember>
      <staffMemberNumber>2</staffMemberNumber>
      <name>Sato</name>
    </staffMember>
  </section>
</sections>
```

```
<sections>
  <sys1:repeat> — 53
   <section>
    <sectionName>${section}</sectionName> — 52
      <sys1:repeat condition="section"> — 51
        <staffMember>
          <staffMemberNumber>${staff member number}</staffMemberNumber>
          <name>${name}</name>
        </staffMember>
      </sys1:repeat>
   </section>
  </sys1:repeat>
</sections>
```

```
staff member number, staff member name, district of responsibility, client name, section, sale
1, Tanaka, Kyushu district, CD business firm, section A, 56,000,000
1, Tanaka, Kansai district, EF company, section F, 3,000,000
2, Sato, Kanto district, AB trading company, section J, 100,000,000
1, Tanaka, Kyushu district, GH trading company, section S, 1,000,000
1, Tanaka, Kyushu district, CD business firm, section T, 200,000,000
```

```
<businessRecord>
  <sys1:repeat>
  <staffMember>
    <ID>${staff member number}</ID>
    <name>${staff member name}</name>
    <clientsSortedByDistricts>  ~152
      <sys1:repeat condition="staff member number">~151
        <districtOfResponsibility district=${district of responsibility}> ~154
          <sys1:repeat condition="district of responsibility">~153
            <client>
              <clientName>${client name}</clientName>~156
              <sys1:repeat condition="client name"> ~155
                <sections>
                  <section>${section}</section>
                  <sale>${sale}</sale>
                </sections>
              <sys1: repeat>
            </client>
          </sys1: repeat>
        </districtOfResponsibility>
      </sys1: repeat>
    </clientsSortedByDistricts>
  </staffMember>
  </sys1: repeat>
</businessRecord>
```

FIG. 15

```
<businessRecord>
  <staffMember>
    <ID>1<ID>
    <name>Tanaka</name>
    <clientsSortedByDistricts>
        <districtOfResponsibility district="Kyushu district">
            <client>
              <clientName>CD business firm</clientName>
                <sections>
                  <section>section A</section>
                  <sale>56,000,000</sale>
                </sections>
                <sections>
                  <section>section T</section>
                  <sale>200,000,000</sale>
                </sections>
            </client>
            <client>
              <clientName>GH trading cpmpany</clientName>
                <sections>
                  <section>section S</section>
                  <sale>1,000,000</sale>
                </sections>
            </client>
        </districtOfResponsibility>
        <districtOfResponsibility district="Kansai district">
            <client>
              <clientName>EF company</clientName>
                <sections>
                  <section>section F</section>
                  <sale>3,000,000</sale>
                </sections>
            </client>
        </districtOfResponsibility>
    </clientsSortedByDistricts>
</staffMember>
<staffMember>
    <ID>2<ID>
    <name>Sato</name>
    <clientsSortedByDistricts>
```

FIG. 14

SYSTEM AND METHOD FOR TRANSFORMING TABULAR FORM DATE INTO STRUCTURED DOCUMENT

CROSS-REFERENCE TO RELATED APPLICATIONS

This application is based upon and claims the benefit of priority from prior Japanese Patent Application No. 2006-269054, filed Sep. 29, 2006, the entire contents of which are incorporated herein by reference.

BACKGROUND OF THE INVENTION

1. Field of the Invention

The present invention relates to a system and method for transforming tabular form data into a structured document.

2. Description of the Related Art

In a structured document, a hierarchical structure is expressed using character strings called tags. As a typical structured document, a document of an Extensible Markup Language (XML) form, namely, an XML document, is well known. XML is characterized in hierarchy of data using meaningful tags and in free extensibility of structure.

In general, to manage data used in companies so that it can be searched for, a database, such as a relational database (RDB), is utilized, and the data is treated as tabular form data obtained by mapping the data in a table. However, in accordance with advance in information technology and the increase of complexity of data to be managed, there is an increasing demand for XML documents that enable data to be freely written as mentioned above, and for XML databases used to search and analyze XML documents. In accordance with this tendency, there is a demand for a function of transforming various data items used in, for example, companies into XML documents (XML document data), and storing/managing them so as to easily process them in accordance with future business growth.

To this end, various data integration tools have recently been developed. These tools are used to collect (extract) data (tabular form data) from various data sources (e.g., RDBs) existing in companies, and transform it into a preset form (XML form). The tools are also used to store the resultant XML form data into an XML database. In the tools, a mapping form is supported, in which original data items and transformed data items are arranged as in a contrast table and corresponding data items are related to each other using lines connecting them. In a tabular form used in, for example, RDBs, each row is treated as a schema for mapping.

Jpn. Pat. Appln. KOKAI Publication No. 2005-56085 (prior art document) discloses a technique of transforming a table (tabular form data) in an RDB into a structured document, and vice versa. In this technique, one transform definition, for example, is described per one row of tabular form data in the RDB. In the process of transforming tabular form data into structured document (XML document) data, data is acquired from the RDB by issuing Structured Query Language (SQL) when each transform definition is called, whereby transformation is performed in units of rows of data in accordance with the transform definitions. In this case, the transform definitions can be described in a nesting structure.

In the data structure transform technique (prior art) described in the prior art document, the respective rows of tabular form data are made to correspond to a group of XML tags. As a result, tabular form data for each staff member of a company is transformed into XML form data (an XML document) in which data for each staff member repeatedly appears. The XML document acquired by data structure transformation is a flat-expression document in which the same structure is regularly repeated. Namely, the XML form data acquired by data structure transformation contains descriptions similar to those of the tabular form data, and these data items differ only in form. Thus, the above-mentioned prior art has failed in exploiting the advantage of XML, i.e., high flexibility in description.

BRIEF SUMMARY OF THE INVENTION

According to an embodiment of the present invention, there is provided a system for transforming, into a structured document, tabular form data arranged in rows. The system comprises a definition data storage unit which stores definition data defining a rule used to transform tabular form data into a structured document, the definition data including a conditional repeat specifying description for specifying grouping of part of the rows which corresponds to a common item having a single value, the conditional repeat specifying description being provided with the common item as an attribute value for a condition for repetition, the definition data further including a portion into which the tabular form data is inserted as content of an element, the portion including a value insertion specifying description which specifies insertion of a value, the value insertion specifying description being made to correspond to an item name of an item included in the tabular form data, and a transformation unit configured to transform to-be-transformed tabular form data, designated by an external device, into a structured document in accordance with the definition data, the transformation unit transforming the tabular form data, with the part of the rows grouped as one group, and embedding a value of the item name made to correspond to the value insertion specifying description, in a portion of the structured document specified by the value insertion specifying description.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view illustrating an example of tabular form data;

FIG. 4 is a view illustrating an example of an XML document (XML structure) expected to be obtained by transforming the tabular form data of FIG. 3;

FIG. 13 is a view illustrating an example of tabular form data for explaining a definition file used in a modification of the embodiment;

FIG. 14 is a view illustrating an example of an XML document (XML structure) expected to be obtained by transforming the tabular form data of FIG. 13; and FIG. 15 is a view illustrating a definition file used in the modification of the embodiment, the definition file being an example used to transform the tabular form data of FIG. 13 into the XML document of FIG. 14.

DETAILED DESCRIPTION OF THE INVENTION

Figure 1:
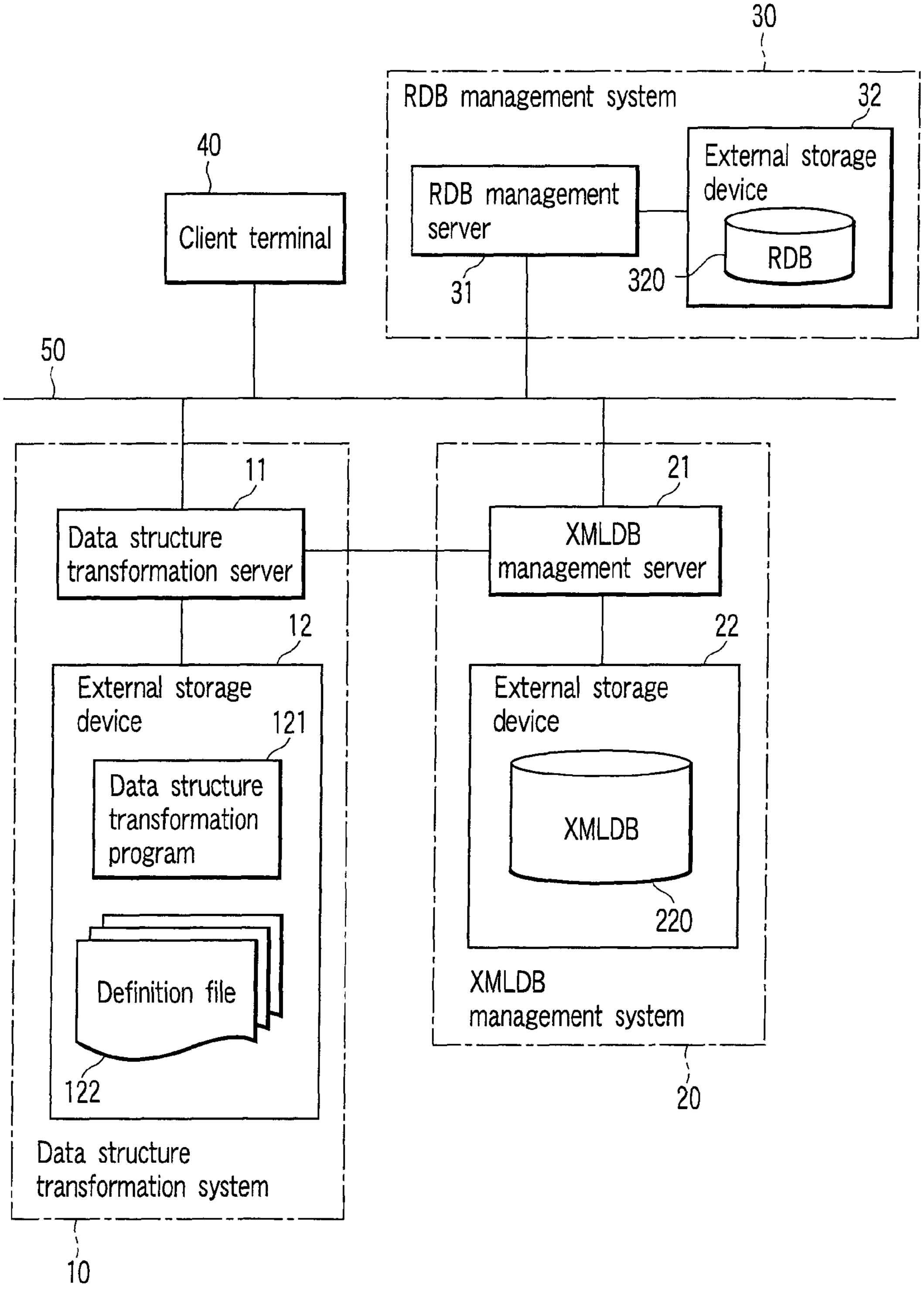
FIG. 1 is a block diagram illustrating the hardware configuration of a client server system including a data structure transformation system according to an embodiment of the invention.

An embodiment of the invention will be described with reference the accompanying drawings. FIG. 1 is a block diagram illustrating the hardware configuration of a client server system including a data structure transformation system according to the embodiment of the invention. The client server system mainly comprises a data structure transformation system 10, XML database (XMLDB) management system 20, relational database (RDB) management system 30, client terminal 40 and network 50. The data structure transformation system 10, XML database (XMLDB) management system 20, relational database (RDB) management system 30 and client terminal 40 are connected to each other via the network 50.

The data structure transformation system 10 includes a data structure transformation server (data structure transformation server computer) 11, and external storage device 12 such as a hard disk drive. The external storage device 12 stores a data structure transformation (tabular form-structured document transformation) program 121, and definition file 122.

The data structure transformation program 121 is used to cause the data structure transformation server 11 to execute a data structure transform process (tabular form-structured document transform process) of transforming tabular form data into a structured document. The definition file 122 is XML form data (XML document) that defines a rule (transformation rule) applied when transforming tabular form data into a structured document. In the embodiment, the definition file 122 holds a description specifying grouping of a plurality of rows in the tabular form data that correspond to each repeated item having a single value. More specifically, the definition file 122 holds a description (value insertion specifying description) for specifying insertion (embedding) of a value, in a portion into which tabular form data is mapped, and which is included in an XML document obtained by transforming the tabular form data (i.e., an XML document of an expected structure). The definition file 122 also holds, in a repeat specifying portion, a description (repeat specifying description) which includes a repeat specifying node and condition. The data structure transformation server 11 reads the data structure transformation program 121 from the external storage device 12, and executes it. By executing the data structure transformation program 121, the data structure transformation server 11 executes data structure transformation processing for transforming tabular form data into a structured document, based on the definitions included in the definition file 122.

The XMLDB management system 20 comprises an XMLDB management server (XMLDB management server computer) 21, and an external storage device 22 such as a hard disk drive. The external storage device 22 stores an XMLDB (XML database) 220. The XMLDB 220 stores a set of XML documents collected from an external data source (XML document data source), and a set of XML documents transformed by the data structure transformation server 11. The XMLDB management server 21 performs processing for storing XML documents in the XMLDB 220, and performs, upon receiving a search request from an external device (e.g., the client terminal 40), processing for searching, from the XMLDB 220, for an XML document (or a portion of an XML document) that satisfies the search condition designated by the request.

The RDB management system 30 comprises an RDB management server (RDB management server computer) 31, and an external storage device 32 such as a hard disk drive. The external storage device 32 stores an RDB (relational database) 320. The RDB management server 31 performs processing for storing tabular form data into the RDB 320, and performs, based on a search request from an external device (e.g., the client terminal 40), processing for searching, from the RDB 320, for tabular form data that satisfies the search condition designated by the request.

Figure 2:
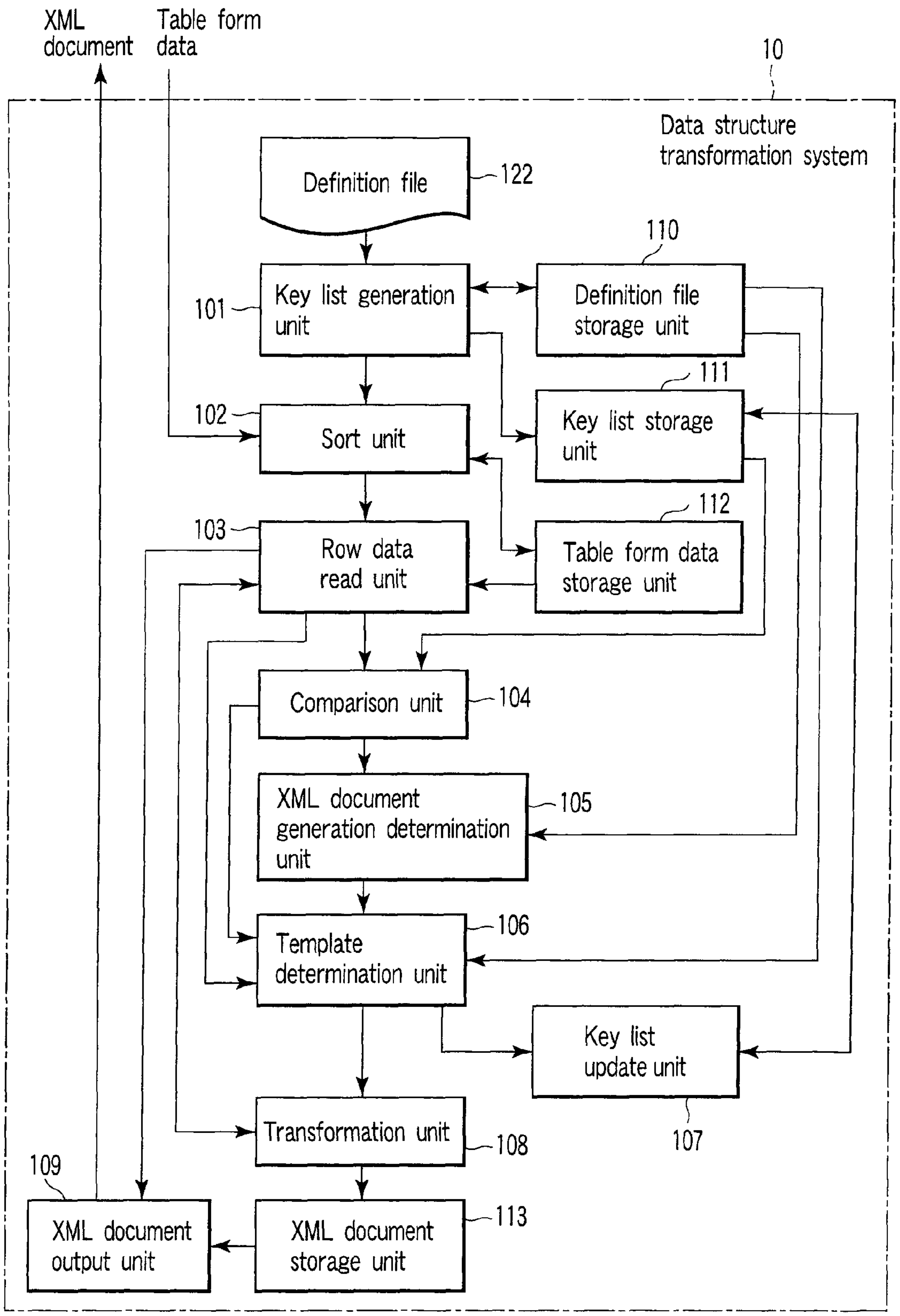
FIG. 2 is a block diagram mainly illustrating the functional configuration of the data structure transformation system shown in FIG. 1.

FIG. 2 is a block diagram mainly illustrating the functional configuration of the data structure transformation system 10 shown in FIG. 1. The data structure transformation system 10 comprises a key list generation unit 101, sort unit 102, row data read unit 103, comparison unit 104, XML document generation determination unit 105, template determination unit 106, key list update unit 107, transformation unit 108 and XML document output unit 109. The data structure transformation system 10 further comprises a definition file storage unit 110, key list storage unit 111, tabular form-data storage unit 112 and XML document storage unit 113.

The processing units 101 to 109 are implemented by the data structure transformation server 11 of FIG. 1 reading the data structure transformation program 121 from the external storage device 12 and executing it. The functions of the processing units 101 to 109 will be described later. The data structure transformation program 121 can be beforehand stored in a computer readable recording medium and distributed. Further, the data structure transformation program 121 may be downloaded into the data structure transformation server 11 via a network 50. The storage units 110 to 113 are implemented using storage areas of a memory (not shown) such as a main memory incorporated in the data structure transformation server 11.

Figures 5, 6A:
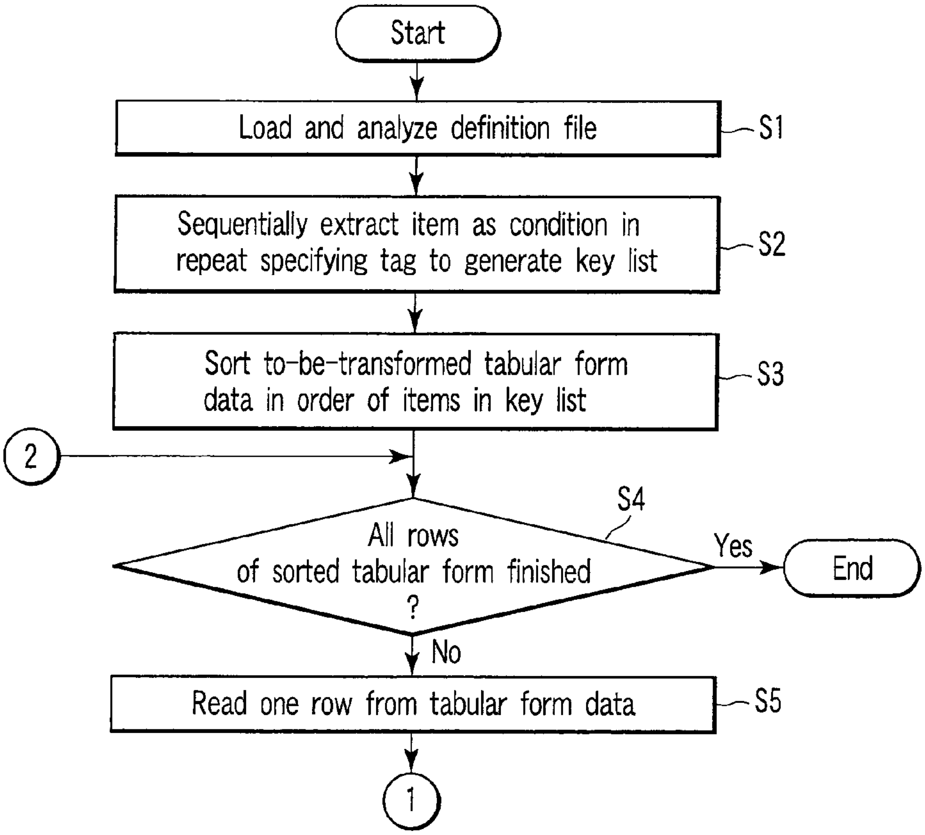
FIG. 5 is a view illustrating an example of a definition file for transforming the tabular form data of FIG. 3 into an XML document of the structure shown in FIG. 4.
FIGS. 6A and 6B are flowcharts illustrating the procedure of data structure transformation processing for transforming tabular form data into an XML document (XML structure)

Referring then to FIGS. 3 to 5, a specific example of the definition file 122 will be described. FIG. 3 shows an example of tabular form data to be transformed, FIG. 4 shows an example of an XML document (XML structure) expected to be obtained by transforming the tabular form data of FIG. 3, and FIG. 5 shows an example of the definition file 122 used to transform the tabular form data of FIG. 3 into an XML document of the structure shown in FIG. 4.

When an expected XML document (i.e., an XML document obtained by transforming tabular form data as shown in FIG. 3) is designed as shown in FIG. 4, the definition file 122 used to transform the tabular form data of FIG. 3 into the XML document (XML structure) of FIG. 4 has an XML form as shown in FIG. 5. The definition file 122 includes a portion enclosed by a pair of tags (i.e., a start tag and end tag) and indicating an element name. In this portion, data (an item value) is inserted as the content of an element. Specifically, this portion holds "${item name}" as a description (value insertion specifying description) for specifying insertion of a value. The description "${item name}" is made to correspond to the item name of the tabular form data indicated by the description "${item name}". When the tabular form data is of, for example, a Comma Separated Value (CSV) form, the item name in the description "${item name}" is changed depending upon whether it is written at the top of the tabular form data. If it is written at the top, the item name in the description "${item name}" is the item name itself written at the top. On the other hand, if the item name is not written at the top, the column number (${0}, ${1}, . . . ) in the tabular form data is used as the item name in the description "${item name}." In the case where the tabular form data is RDB data, the item name in the description "${item name}" is a column name.

The definition file 122 also holds, in a repeat specifying portion, a description (conditional repeat specifying description) specifying conditional repeat, which is used to group, for transformation, the data of each item that appears repeatedly. The conditional repeat specifying description includes a node (repeat specifying tag) specifying repetition, and a condition (condition for repetition). In the XML document shown in FIG. 4 and obtained after transformation, data of a plurality of rows included in a certain section (FIG. 3) is nested within a plurality of "staffMember" tags. The portion nested within each item "section" as a condition for repetition is an element nested within a "sectionName" tag. In this case, as shown in FIG. 5, a repeat specifying tag 51 (<sys1: repeat condition="section">) is nested within a "sectionName" tag 52. The repeat specifying tag 51 includes the above-mentioned condition (condition="section") as an attribute. Namely, the repeat specifying tag 51 is a conditional repeat specifying tag. The left side of "condition="section,"" i.e., "condition," is an attribute name, and the right side, i.e., "section," is an attribute value.

In the example of the definition file 122 shown in FIG. 5, a repeat specifying tag 53 with no condition (i.e., unconditional repeat specifying tag) is nested within the leading tag ("sections" tag as a root tag). The repeat specifying tag used in the embodiment is a repeat tag with a name space (sys1) for the definition file 122.

Referring then to the flowchart of FIGS. 6A and 6B, a description will be given of data structure transformation processing for transforming tabular form data into a structured document (XML document), executed in the data structure transformation system 10. Suppose here that a transformation request to transform certain tabular form data into an XML document is issued from, for example, the client terminal 40 to the data structure transformation system 10. This request includes information that specifies the file name of a definition file 122 used for the transformation, and tabular form data to be transformed.

The key list generation unit 101 of the data structure transformation system 10 loads the definition file 122 of the file name identical to that included in the transformation request, from the external storage device 12 to the definition file storage unit 110 (step S1). At step S1, the key list generation unit 101 parses the definition file 122 (i.e., the definition file 122 of an XML form) loaded to the definition file storage unit 110.

During the parsing of the definition file 122, the key list generation unit 101 sequentially reads data from the definition file 122, beginning with the leading data, and extracts a conditional repeat specifying tag from the read data (step S2). At step S2, the key list generation unit 101 adds, to a key list stored in the key list storage unit 111, an attribute value (in the example of the definition file 122 of FIG. 5, "section" corresponds to the value) indicating a condition and contained in the extracted conditional repeat specifying tag, the attribute value serving as a key list item (key name). By parsing the entire data of the definition file 122, the key list generation unit 101 generates a key list.

The generated key list is used to sort tabular form data to be transformed into an XML document. Each key in the key list is formed of a key name as a key item, and a key value. In this stage, no key value exists in the key list. The order of keys (attribute values) stored into the key list indicates the order of priority of sorting based on the keys. Supposing that a key list stores N keys (N is an integer not less than 2), the $i^{th}$ key (i=1, . . . , N) indicates the $1^{st}$ key, . . . , or the $N^{th}$ key. The leading key in the key list is used as the $1^{st}$ key, and the last key in the key list is used as the $N^{th}$ key.

After generating the key list, the key list generation unit 101 passes control to the sort unit 102. The sort unit 102 acquires tabular form data, to be transformed, from the client terminal 40 or RDB management system 30 (namely, the RDB 320 in the RDB management system 30), and stores it into the tabular form-data storage unit 112 (step S3). To specify tabular form data, a file name is used in the case of the CSV file format, and SQL is used in the case of the RDB file format. At step S3, the sort unit 102 sequentially sorts the tabular form data stored in the tabular form-data storage unit 112, based on the order of the keys (more specifically, the order of the attribute values serving as a condition for repetition, i.e., the item values) in the key list generated at step S2. When N keys are contained in the key list, the tabular form data is sorted in the order of the $1^{st}$ key, $2^{nd}$ key, . . . , $N^{th}$ key. After sorting, the tabular form data is again stored in the tabular form-data storage unit 112.

After sorting the tabular form data, the sort unit 102 passes control to the row data read unit 103. The row data read unit 103 starts processing of reading, as to-be-transformed row data, the sorted tabular form data in units of rows, beginning with the leading row of the data (steps S4 and S5). Specifically, when the row data read unit 103 reads the leading (first) row of the data as to-be-transformed row data (step S6), it passes control to the template determination unit 106. The template determination unit 106 determines (extracts) an element, nested within the leading tag (route tag) in the definition file 122, as a template used to transform the to-be-transformed row data into the XML form (step S7).

Further, when the row data read unit 103 reads, as to-be-transformed row data, data (the $2^{nd}$-row or later data) other than the leading-row data (step S6), it passes control to the comparison unit 104. The comparison unit 104 compares the value of each key (item) in the key list with the value of the corresponding item included in the read row data (to-betransformed row data), beginning with the leading (first) key, and continues the comparison until they are determined to be unequal to each other (step S8). From the comparison results, the comparison unit 104 determines whether the value of the leading key in the key list is equal to the value of the corresponding item included in the to-be-transformed row data (step S9).

If it is determined at step S9 that they are equal to each other, the template determination unit 106 executes step S10. Specifically, at step S10, the template determination unit 106 determines a template used to transform the row data into the XML form, based on the result of comparison of the value of the present key in the key list with the value of the corresponding item included in the to-be-transformed row data. Namely, the template determination unit 106 determines (extracts), as the template, an element nested within the conditional repeat specifying tag in the definition file 122 that specifies the repetition of the item (of the row data) corresponding to the key lastly determined equal.

On the other hand, if it is determined at step S9 that they are unequal to each other, the XML document generation determination unit 105 executes step S11. Specifically, at step S11, the XML document generation determination unit 105 determines whether an unconditional repeat specifying tag in the definition file 122 is a route tag.

If it is determined that the unconditional repeat specifying tag in the definition file 122 is not a route tag (step S11), the XML document generation determination unit 105 passes control to the template determination unit 106. The template determination unit 106, in turn, determines (extracts) an element, nested within the unconditional repeat specifying tag in the definition file 122, as a template used to transform the to-be-transformed row data into XML form data (step S12). In contrast, if the unconditional repeat specifying tag is a route tag, the XML document generation determination unit 105 determines to generate a new XML document (XML file) using a subsequently determined (extracted) template (step S13). At this time, the template determination unit 106 determines (extracts) an element, nested within the unconditional repeat specifying tag in the definition file 122, as a template used to transform the to-be-transformed row data into XML form data (step S12).

After the template determination unit 106 determines (extracts) the template (step S7, S10 or S12), the template determination unit 106 passes control to the key list update unit 107. The key list update unit 107 updates the key list stored in the key list storage unit 111, based on the to-be-transformed row data (step S14). Specifically, the key list update unit 107 updates the values of keys (items) (i.e., key values) in the key list, using the values of the corresponding items of the to-be-transformed row data. At step S14 in the first loop, the keys in the key list have no values, and hence the values of the corresponding items of the to-be-transformed row data are set as the values of the keys.

After the key list update unit 107 updates the key list (step S14), the key list update unit 107 passes control to the transformation unit 108. The transformation unit 108, in turn, inserts (embeds) the value of the specified item of the to-be-transformed row data, into a value-insertion specified portion in the template determined by the template determination unit 106 (step S15). As a result of the insertion of the (step S15), the to-be-transformed row data (tabular form data) is transformed into XML form data. At step S15, the transformation unit 108 sets the XML form data obtained by transforming the to-be-transformed row data, in the XML document stored in the XML document storage unit 113 that is currently being generated.

After executing step S15, the transformation unit 108 passes control to the row data read unit 103. The row data read unit 103 determines the next row data in the sorted tabular form data as row data to be transformed in the next loop (step S16). If the next row data exists, i.e., if the last row data of the sorted tabular form data has not yet been processed (step S4), the above-mentioned steps S5 et seq. are executed on the next row data.

When the last row data has been processed (step S4), the data structure transformation process is finished. At this time, the XML document stored in the XML document storage unit 113 is regarded as the XML form data obtained by transforming the tabular form data stored in the tabular form-data storage unit 112, based on the definition file 122. This XML document is transmitted by the XML document output unit 109 to, for example, the XMLDB management system 20 and stored in the XMLDB 220 of the system 20.

Figure 7:
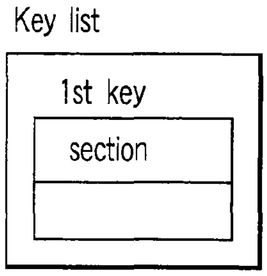
FIG. 7 is a view illustrating an example of a key list generated from the definition file of FIG. 5.

Referring then to FIGS. 7 to 12, a description will be given of an example of the above-mentioned data structure transformation process, in which the tabular form data shown in FIG. 3 is transformed into an XML document using the definition file 122 shown in FIG. 5. As described above, the key list generation unit 101 extracts all conditional repeat specifying tags from the definition file 122. After that, the key list generation unit 101 generates, in the key list storage unit 111, a key list in which attributes values indicating conditions contained in the extracted conditional repeat specifying tags are used as the items (key names) of the key list (step S2). In the embodiment, the definition file 122 contains only one conditional repeat specifying tag, i.e., the repeat specifying tag 51 <sys1: repeat condition="section">. In this case, the key list generation unit 101 sets "section" as the 1$^{st}$ key of the key list. FIG. 7 shows the key list.

The sort unit 102 sequentially sorts the tabular form data of FIG. 3, based on the order of keys in the key list of FIG. 7 (step S3). In this case, the tabular form data is sorted alphabetically, using only the 1$^{st}$ key, "section." FIG. 8 shows the relationship between the key list, tabular form data (original data) and sorted tabular form data.

Figure 8:
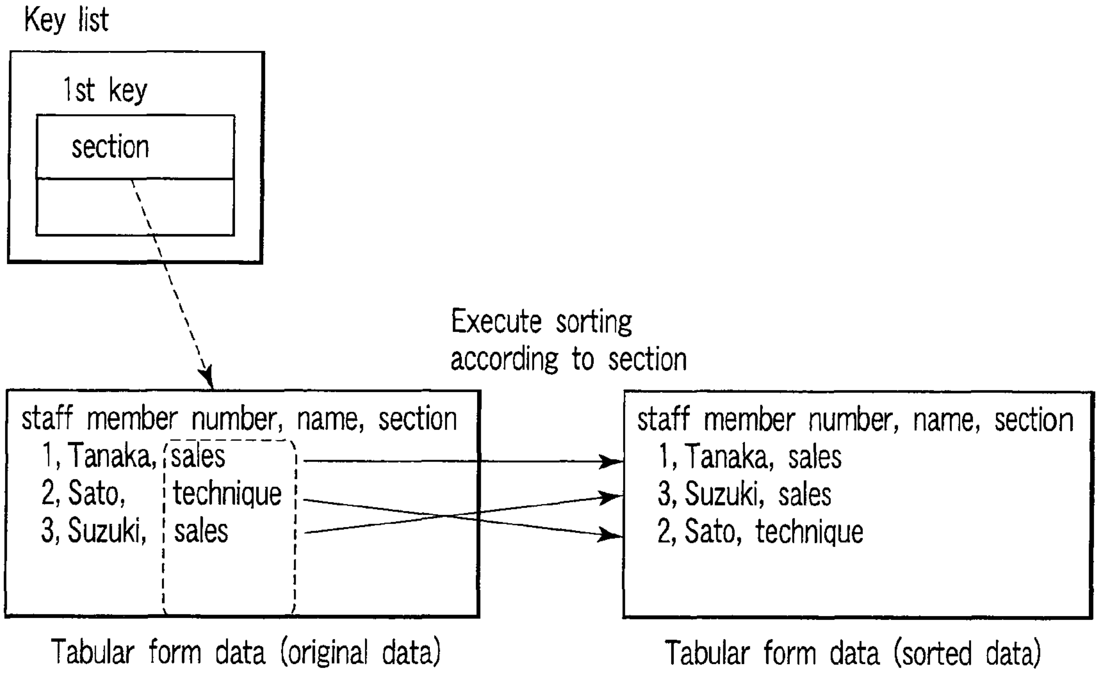
FIG. 8 is a view illustrating the relationship between a key list, tabular form data (original data), and sorted tabular form data, useful in explaining sorting based on a key included in the key list.
Figure 9:
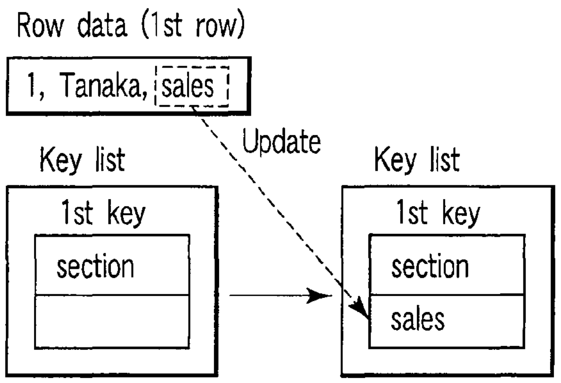
FIG. 9 is a view useful in explaining updating of the value of a key in the key list into the value of the corresponding item included in a to-be-transformed first row.
Figure 10:
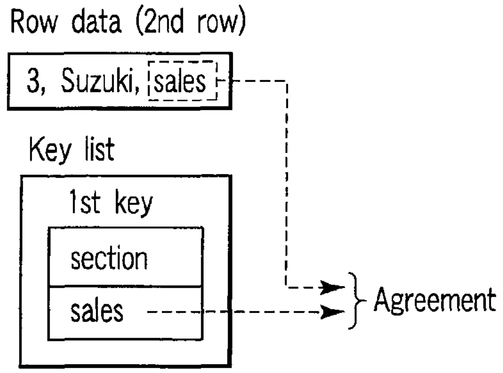
FIG. 10 is a view useful in explaining the comparison of the value of a key in the key list with the value of the corresponding item included in a to-be-transformed second row.

When the row data read unit 103 reads, as to-be-transformed data, the leading (first) row data of the sorted tabular form data shown in FIG. 8 (steps S5 and S6), the template determination unit 106 determines that an element ("sections" element) nested within the leading tag (route tag) in the definition file 122 is set as a template (step S7).

As a result, the key list update unit 107 sets, as the value of the key (1$^{st}$ key) in the key list, section value "sales" included in the 1$^{st}$ row data "1 (staff member number), Tanaka (name), sales (section)" (step S14).

Subsequently, the transformation unit 108 inserts the values of specified items, included in the 1$^{st}$ row data (to-be-transformed row data), into value-insertion specified portions of the template currently determined by the template determination unit 106, namely, into value-insertion specified portions of a "sections" element (i.e., the copy of the "sections" element) as an element nested within the leading tag in the definition file 122 (step S12). In this case, "sales" "1" and "Tanaka" are inserted in the portions ${section}, ${staff member number} and ${name}, respectively. Thus, the 1$^{st}$ row data is transformed into XML form data including a "sections" element. The "sections" element includes a section element, and the section element includes a section name element and staff member element.

After that, the to-be-transformed row data is switched to the 2$^{nd}$ row data of the sorted tabular form data (step S16). The 2$^{nd}$ row data of the sorted tabular form data is "3 (staff member number), Suzuki (name) and sales (section)" (see FIG. 8).

In this case, the value “sales” of the $1^{st}$ key in the key list is equal to the value “sales” of the corresponding item “section” in the to-be-transformed row data ($2^{nd}$ row data) (steps S8 and S9). Since at this time, the key list contains only the $1^{st}$ key, the key lastly determined to be equal in value to the corresponding item in the row data is the $1^{st}$ key firstly determined to be equal. Accordingly, in the definition file 122 of FIG. 5, an element (staff member element) nested within the conditional repeat specifying tag 51 of the item “section” corresponding to the $1^{st}$ key is determined as a template (step S10).

After that, the value of the $1^{st}$ key of the key list is updated to the value “sales” of the item “section” included in the $2^{nd}$ row data “1 (staff member number), Tanaka (name), sales (section)” and corresponding to the $1^{st}$ key (step S14). Note that the value of the $1^{st}$ key of the key list before updating is “sales” (see FIG. 10), and the value of the $1^{st}$ key of the key list after updating is “sales,” namely, it is the same as the value before updating.

Subsequently, the values of specified items in the $2^{nd}$ row data are inserted into value-insertion specified portions of the template currently determined by the template determination unit 106, namely, into value-insertion specified portions of a staff member element (i.e., the copy of the staff member element) as an element nested within the conditional repeat specifying tag 51 (<sys1:repeat condition=“section”>) in the definition file 122 (step S15). In this case, “3” and “Suzuki” are inserted in the portions ${staff member number} and ${name}, respectively.

Thus, the $2^{nd}$ row data is transformed into XML form data formed of a staff member element. The XML form data (staff member element) is additionally set after the staff member element as XML form data corresponding to the $1^{st}$ row data included in the XML document that is currently being generated. The staff member element is formed of a staff member number element and name element. Namely, in the embodiment, among the sorted tabular form data, the $1^{st}$ row data “1 (staff member number), Tanaka (name), sales (section)” and the $2^{nd}$ row data “3 (staff member number), Suzuki (name), sales (section),” in which the values of the item “section” specified by the condition imparted to the conditional repeat specifying tag 51 (<sys1:repeat condition=“section”>) are equal, are grouped based on the common value “sales” of the item “section.”

Figure 11:
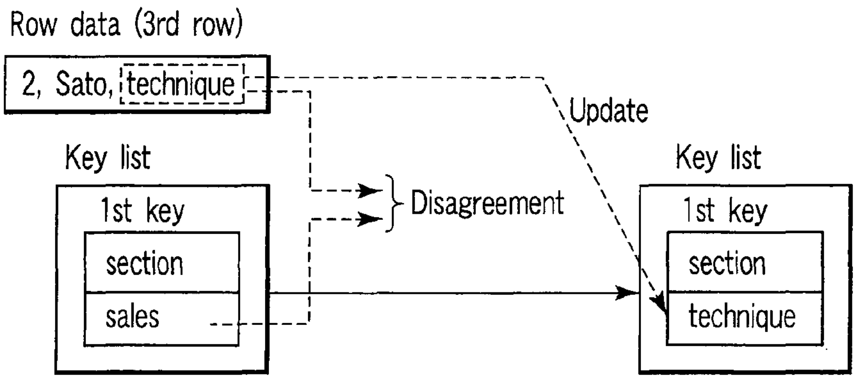
FIG. 11 is a view useful in explaining the comparison of the value of a key in the key list with the value of the corresponding item included in a to-be-transformed third row, and also explaining updating of the key list.

Subsequently, the to-be-transformed row data is switched to the $3^{rd}$ row (last row) data (step S16). Since the $3^{rd}$ row data is “2 (staff member number), Sato (name), technique (section),” the value “sales” of the $1^{st}$ key of the key list is unequal to the value “technique” of the corresponding item “section” in the to-be-transformed row data ($3^{rd}$ row data) (steps S8 and S9), as is shown in FIG. 11. Further, the unconditional repeat specifying tag 53 in the definition file 122 is not a rout tag (step S11). In this case, an element (section element) nested within the unconditional repeat specifying tag 53 (<sys1:repeat>) in the definition file 122 is determined as a template (step S10).

If the value of the $1^{st}$ key of the key list is unequal to the value of the corresponding item in the to-be-transformed row data, and if the unconditional repeat specifying tag 53 is not a route tag, the tag 53 specifies the transformation of the to-be-transformed row data into an XML document portion of a new group successive to the XML document portion of the preceding group. In contrast, if the unconditional repeat specifying tag 53 is a route tag unlike the embodiment, the tag 53 specifies the transformation of the row data into an XML document portion included in a new XML document that differs from an XML document including the XML document portion of the preceding group.

Thereafter, the value “sales” of the $1^{st}$ key of the key list is updated to the value “technique” of the item “section” included in the $3^{rd}$ row data “2 (staff member number), Sato (name), technique (section)” (step S14), as is shown in FIG. 11.

At step S15, the values of specified items, included in the $3^{rd}$ row data are inserted into value-insertion specified portions of the template currently determined by the template determination unit 106, namely, into value-insertion specified portions of a section element (i.e., the copy of the section element) as an element nested within the unconditional repeat specifying tag 53 (<sys1:repeat>) in the definition file 122 (step S15). In this case, “technique,” “2” and “Sato” are inserted in the portions ${section}, ${staff member number} and ${name}, respectively. Thus, the $3^{rd}$ row data is transformed into XML form data including a section element. This XML form data is additionally set after the section element of the XML form data currently being generated and obtained by grouping $1^{st}$ and $2^{nd}$ row data based on the section “technique.”

In the manner described above, the tabular form data shown in FIG. 3 is transformed into the XML document shown in FIG. 4. This XML document differs from the prior art in which each row of tabular form data is transformed into a structure. Namely, in the embodiment, tabular form data is transformed into a structured document including a structure in which a plurality of rows in the tabular form data are collected up. Specifically, in the embodiment, if a target repeated item, e.g. “section,” included in the tabular form data shown in FIG. 3 (specified by the conditional repeat specifying tag 51 in the definition file 122), has a single value, grouping is performed on the tabular form data based on the item, whereby the tabular form data is transformed into an XML document. Thus, the tabular form data of FIG. 3 is transformed into the XML document of FIG. 4 that includes a structure in which a plurality of rows are grouped. The XML document of FIG. 4 sufficiently exhibits flexible description capacity as a feature of XML.

Figure 6B:
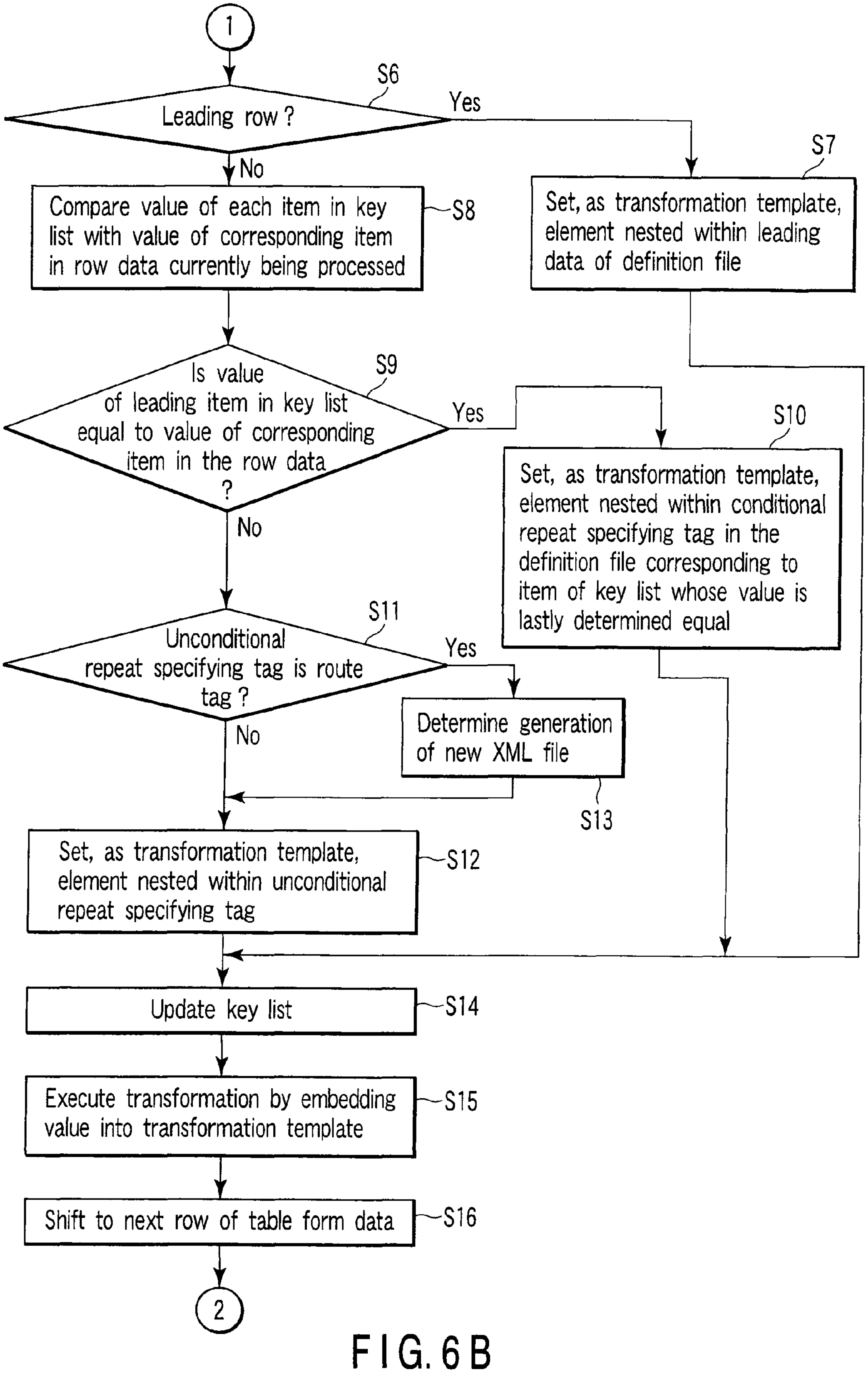
Figure 12A:
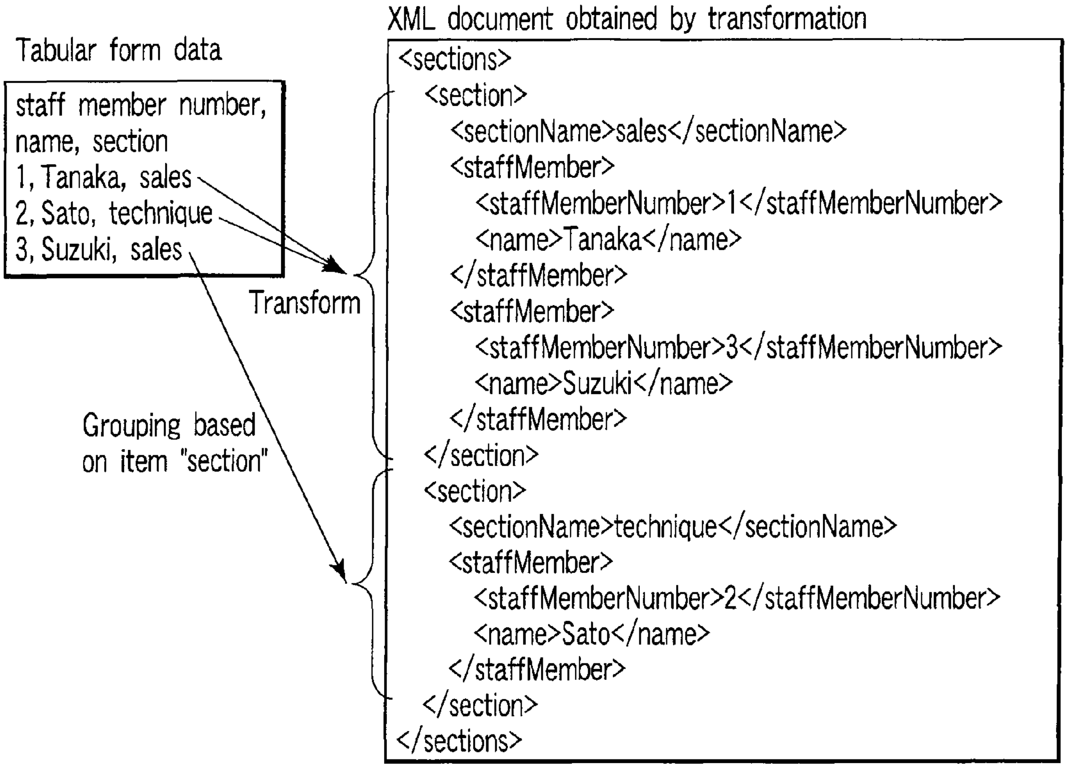
FIG. 12A is a view illustrating a state in which the tabular form data of FIG. 3 is transformed into the XML document of FIG. 4 by grouping the tabular form data, based on item "section," in accordance with the flowchart of FIGS. 6A and 6B.
Figure 12B:
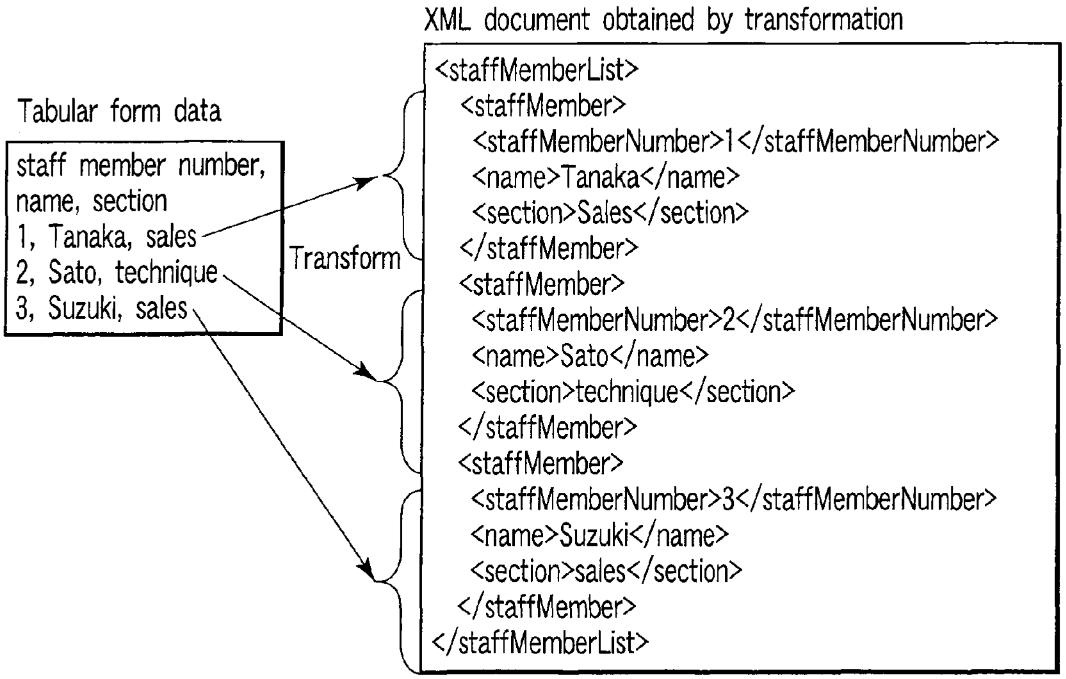
FIG. 12B is a view illustrating a state in which the tabular form data of FIG. 3 is transformed into XML form data in units of rows, using the prior art, thereby obtaining an XML document.

FIG. 12A shows a state in which the tabular form data of FIG. 3 is grouped based on the item “section” in accordance with the flowchart of FIGS. 6A and 6B, and is transformed into the XML document of FIG. 4. FIG. 12B shows a state in which the tabular form data of FIG. 3 is transformed, by the prior art, into XML form data in units of rows of the data, thereby obtaining an XML document.

A brief description will now be given of the case where the unconditional repeat specifying tag 53 is a route tag, unlike the example of FIG. 5. In this case, using an element nested within the route tag of the definition file 122, the $3^{rd}$ row data of sorted tabular form data, “2 (staff member number), Sato (name), technique (section),” is transformed into a new XML document different from the XML document obtained by transforming the $1^{st}$ and $2^{nd}$ row data.

[Modification]

The definition file 122 employed in the above-described embodiment sets therein only one conditional repeat specifying tag. However, the definition file may set therein a plurality of conditional repeat specifying tags arranged in a nesting structure. Referring to FIGS. 13 to 15, a modification of the definition file, which includes such conditional repeat specifying tags as arranged in a nesting structure, will be described. FIG. 13 shows an example of tabular form data to be transformed, FIG. 14 shows an example of an expected XML document (XML structure) obtained by transforming tabular form data of FIG. 13, and FIG. 15 shows an example of a definition file 222 used to transform the table data form of FIG. 13 into the XML document of FIG. 14.

When an expected XML document (XML document obtained by transforming the tabular form data of FIG. 13) is designed as shown in FIG. 14, the definition file 222 used to transform the table data form of FIG. 13 into the XML document (XML structure) of FIG. 14 has an XML form as shown in FIG. 15. In the XML document of FIG. 14, a plurality of rows of data corresponding to a certain staff member number are repeatedly nested within a "clientsSortedByDistricts" tag. The portion to be repeated, based on a "staff member number" as a condition for repetition, is an element of a lower order than the "clientsSortedByDistricts" tag. In this case, in the definition file 222 of FIG. 15, a conditional repeat specifying tag 151 (<sys1:repeat condition="staff number member">) is nested within a "clientsSortedByDistricts" tag 152.

Similarly, in the XML document of FIG. 14, data corresponding to a certain "district of responsibility" is repeatedly nested within an "districtOfResponsibility" tag, and data corresponding to a certain "client name" is repeatedly nested within a "clientName" tag. In the definition file 222 of FIG. 15, a conditional repeat specifying tag 153 (<sys1:repeat condition="district of responsibility">) is nested within a "districtOfResponsibility" tag 154. Similarly, a conditional repeat specifying tag 155 (<sys1:repeat condition="client name">) is nested within a "clientName" tag 156.

Thus, in the definition file 222 of FIG. 15, the three conditional repeat specifying tags 151, 153 and 155 are nested. However, the number of conditional repeat specifying tags nested is not limited to three. Namely, a plurality of conditional repeat specifying tags (including two, and four or more conditional repeat specifying tags) may be nested in the definition file.

In the above-described embodiment and modification, XML documents are supposed as the structured documents. However, the invention is also applicable to other structured documents, such as Standard Generalized Markup Language (SGML) documents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for transforming, into a structured document, tabular form data arranged in rows, comprising:

a computer;

a definition data storage unit which stores definition data defining a rule used to transform tabular form data into a structured document, the definition data including a conditional repeat specifying description for specifying grouping of part of the rows which corresponds to a common item having a single value, the conditional repeat specifying description being provided with the common item as an attribute value for a condition for repetition, the definition data further including a portion into which the tabular form data is inserted as content of an element, the portion including a value insertion specifying description which specifies insertion of a value, the value insertion specifying description being made to correspond to an item name of an item included in the tabular form data; and a transformation unit configured to transform to-be-transformed tabular form data, designated by an external device, into a structured document in accordance with the definition data, the transformation unit transforming, by the computer, the tabular form data, with the part of the rows grouped as one group, and embedding a value of the item name made to correspond to the value insertion specifying description, in a portion of the structured document specified by the value insertion specifying description;

wherein:

the definition data is formed of a structured document having a structure expressed using markup language tags;

the conditional repeat specifying description is expressed by a first conditional repeat specifying tag, the conditional repeat specifying tag including a condition as an attribute name and the item name as an attribute value; and the value insertion specifying description is enclosed by a start tag and an end tag for an element, the element having an element name, the item name made to correspond to the value insertion specifying description being set as the element name.

2. The system according to claim 1, further comprising:

a key list generation unit configured to generate a key list by parsing the definition data beginning with leading data contained therein, the key list containing items which are set as key names and serve as conditions specified by the conditional repeat specifying tag contained in the definition data;

a key list storage unit which stores the key list;

a sort unit which sorts the to-be-transformed tabular form data in order of the items in the key list;

a tabular form data storage unit which stores the sorted tabular form data;

a row data read unit which reads each row of the sorted tabular form data as to-be-transformed row data;

a comparison unit configured to compare a value of each item of the key list with a value of a corresponding item of the to-be-transformed row data, beginning with a leading item of the key list, until it is detected that the value of an item of the key list is unequal to the value of the to-be-transformed row data; and a key list update unit which updates the value of each item of the key list into the value of the corresponding item of the to-be-transformed row data, wherein when the comparison unit determines that the value of the leading item of the key list is equal to the value of the corresponding item of the to-be-transformed row data, the transformation unit transforms the to-be-transformed row data into a new structured document portion, in accordance with an element nested within the conditional repeat specifying tag in the definition data corresponding to an item of the key list whose value is lastly determined equal, the new structured document portion being a portion subsequent to a lastly transformed structured document portion of the to-be-transformed row data, a portion of the new structured document portion which is specified by the value insertion specifying description being embedded with a value of the item name corresponding to the value insertion specifying description.

3. The system according to claim 2, wherein:

the definition data includes an unconditional repeat specifying tag without the condition for repetition; and the transformation unit transforms the to-be-transformed row data into a structured document portion of a new group, in accordance with an element nested within the unconditional repeat specifying tag in the definition data, when the comparison unit determines that the value of the leading item of the key list is unequal to the value of the corresponding item of the to-be-transformed row data, the structured document portion of the new group being a portion subsequent to a structured document portion of a preceding group, a portion of the structured document portion of the new group which is specified by the value insertion specifying description being embedded with a value of the item name corresponding to the value insertion specifying description.

4. The system according to claim 3, wherein when the unconditional repeat specifying tag is a route tag of the structured document providing the definition data, the transformation unit transforms, in accordance with an element nested within the unconditional repeat specifying tag in the definition data, the to-be-transformed row data into a structured document portion included in a new structured document different from a structured document which includes the structured document portion of the preceding group.

5. The system according to claim 1, wherein:

the definition data includes a plurality of conditional repeat specifying tags including the first conditional repeat specifying tag; and the plurality of conditional repeat specifying tags are set in a nesting structure.

6. A method of transforming, into a structured document, tabular form data arranged in rows, comprising:

storing, into a definition data storage unit, definition data defining a rule used to transform tabular form data into a structured document, the definition data including a conditional repeat specifying description for specifying grouping of part of the rows which corresponds to a common item having a single value, the conditional repeat specifying description being provided with the common item as an attribute value for a condition for repetition, the definition data further including a portion into which the tabular form data is inserted as content of an element, the portion including a value insertion specifying description which specifies insertion of a value, the value insertion specifying description being made to correspond to an item name of an item included in the tabular form data;

storing, into a tabular form data storage unit, to-be-transformed tabular form data designated by an external device; and transforming, by a computer, the tabular form data, stored in the tabular form data storage unit, into a structured document in accordance with the definition data, the transforming the tabular form data, stored in the tabular form data storage unit, into the structured document including transforming the to-be-transformed tabular form data, with the part of the rows grouped as one group, and embedding a value of the item name made to correspond to the value insertion specifying description, in a portion of the structured document specified by the value insertion specifying description;

wherein:

the definition data is formed of a structured document having a structure expressed using markup language tags;

the conditional repeat specifying description is expressed by a conditional repeat specifying tag, the conditional repeat specifying tag including a condition as an attribute name and the item name as an attribute value; and the value insertion specifying description is enclosed by a start tag and an end tag for an element, the element having an element name, the item name made to correspond to the value insertion specifying description being set as the element name.

7. The method according to claim 6, further comprising:

generating a key list containing items which are set as key names and serve as conditions specified by the conditional repeat specifying tag contained in the definition data, the generating the key list including parsing the definition data beginning with leading data contained therein, and storing the key list into a key list storage unit;

sorting the tabular form data, stored in the tabular form data storage unit, in order of the items in the key list;

reading each row of the sorted tabular form data as to-be-transformed row data;

comparing a value of each item of the key list with a value of a corresponding item of the to-be-transformed row data, beginning with a leading item of the key list, until it is detected that the value of an item of the key list is unequal to the value of the to-be-transformed row data; and updating the value of each item of the key list into the value of the corresponding item of the to-be-transformed row data, wherein the transforming the tabular form data, stored in the tabular form data storage unit, into the structured document includes transforming the to-be-transformed row data into a new structured document portion in accordance with an element nested within the conditional repeat specifying tag in the definition data corresponding to an item of the key list whose value is lastly determined equal, when a result of the comparing indicates that the value of the leading item of the key list is equal to the value of the corresponding item of the to-be-transformed row data, the new structured document portion being a portion subsequent to a lastly transformed structured document portion of the to-be-transformed row data, a portion of the new structured document portion which is specified by the value insertion specifying description being embedded with a value of the item name corresponding to the value insertion specifying description.

8. The method according to claim 7, wherein:

the definition data includes an unconditional repeat specifying tag without the condition for repetition; and the transforming the tabular form data, stored in the tabular form data storage unit, into the structured document includes transforming the to-be-transformed row data into a structured document portion of a new group in accordance with an element nested within the unconditional repeat specifying tag in the definition data, when a result of comparison indicates that the value of the leading item of the key list is unequal to the value of the corresponding item of the to-be-transformed row data, the structured document portion of the new group being a portion subsequent to a structured document portion of a preceding group, a portion of the new structured document portion which is specified by the value insertion specifying description being embedded with a value of the item name corresponding to the value insertion specifying description.

9. The method according to claim 8, wherein the transforming the tabular form data, stored in the tabular form data storage unit, into the structured document includes transforming, in accordance with an element nested within the unconditional repeat specifying tag in the definition data, the to-be-transformed row data into a structured document portion included in a new structured document different from a structured document which includes the structured document portion of the preceding group, when the unconditional repeat specifying tag is a route tag of the structured document providing the definition data.

10. A computer program product having a non-transitory computer readable medium including programmed instructions for execution by a computer to transform, into a structured document, tabular form data arranged in rows, the computer including a definition data storage unit and a tabular form data storage unit, the computer program product comprising:

computer-readable program code means for causing the computer to store, into the definition data storage unit, definition data defining a rule used to transform tabular form data into a structured document, the definition data including a conditional repeat specifying description for specifying grouping of part of the rows which corresponds to a common item having a single value, the conditional repeat specifying description being provided with the common item as an attribute value for a condition for repetition, the definition data further including a portion into which the tabular form data is inserted as content of an element, the portion including a value insertion specifying description which specifies insertion of a value, the value insertion specifying description being made to correspond to an item name of an item included in the tabular form data, wherein: the definition data is formed of a structured document having a structure expressed using markup language tags; the conditional repeat specifying description is expressed by a conditional repeat specifying tag, the conditional repeat specifying tag including a condition as an attribute name and the item name as an attribute value; and the value insertion specifying description is enclosed by a start tag and an end tag for an element, the element having an element name, the item name made to correspond to the value insertion specifying description being set as the element name;

computer-readable program code means for causing the computer to store, into the tabular form data storage unit, to-be-transformed tabular form data designated by an external device; and computer-readable program code means for causing the computer to transform the tabular form data, stored in the tabular form data storage unit, into a structured document in accordance with the definition data, the causing the computer to transform the tabular form data, stored in the tabular form data storage unit, into the structured document including causing the computer to transform the to-be-transformed tabular form data, with the part of the rows grouped as one group, and causing the computer to embed a value of the item name made to correspond to the value insertion specifying description, in a portion of the structured document specified by the value insertion specifying description.

* * * * *

UNITED STATES PATENT AND TRADEMARK OFFICE

CERTIFICATE OF CORRECTION

PATENT NO. : 7,886,224 B2
APPLICATION NO. : 11/861096
DATED : February 8, 2011
INVENTOR(S) : Sakai et al.

It is certified that error appears in the above-identified patent and that said Letters Patent is hereby corrected as shown below:

On the Title page, item (54), and Col. 1 line 2, in the title, change “FORM DATE” to --FORM DATA--.

Signed and Sealed this
Tenth Day of May, 2011

David J. Kappos
*Director of the United States Patent and Trademark Office*